April 29, 1969 — R. K. PEARSON — 3,441,145
COIL FILTER
Original Filed Dec. 1, 1966
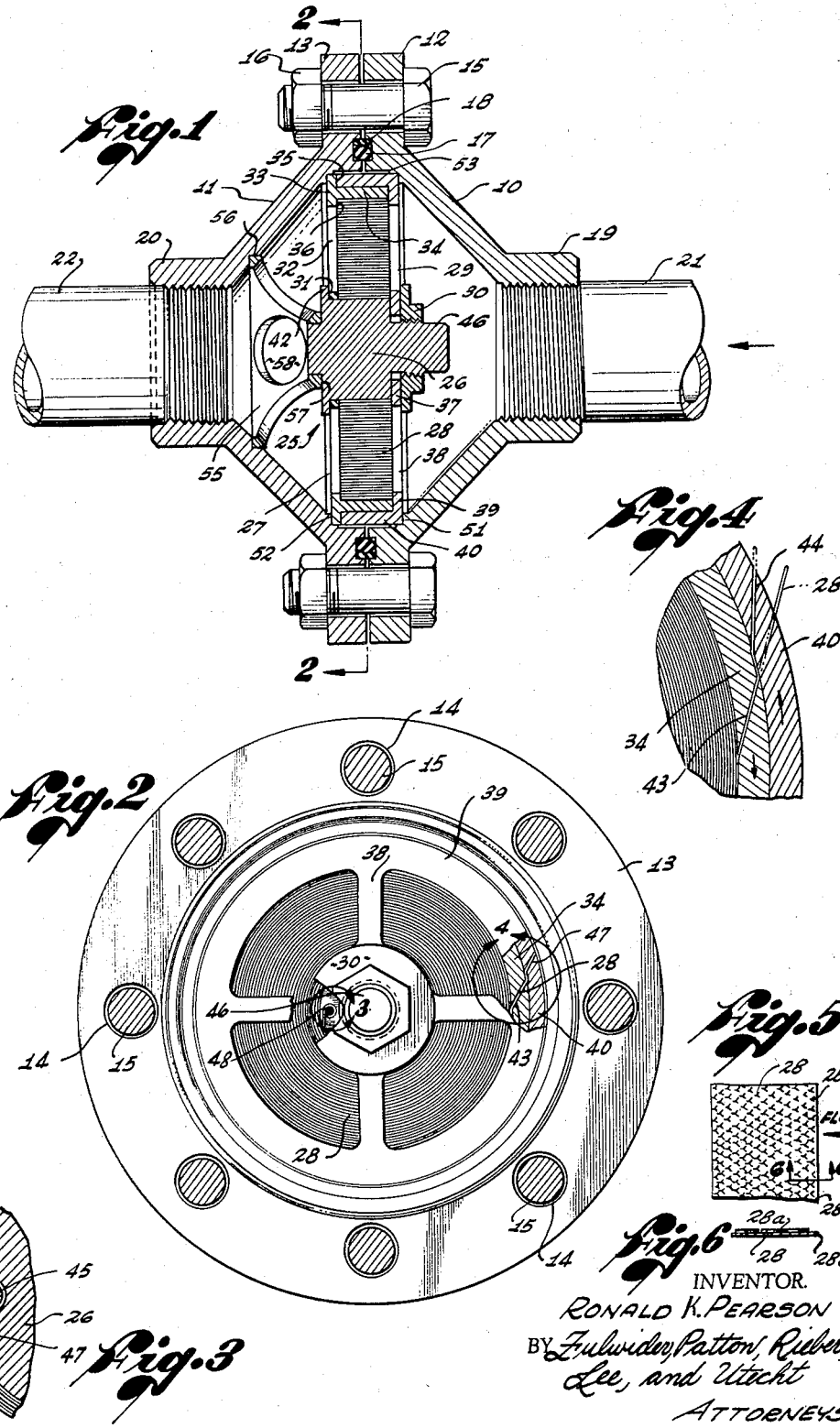
INVENTOR.
RONALD K. PEARSON
BY Fulwider, Patton, Rieber, Lee, and Utecht
ATTORNEYS April 29, 1969     R. K. PEARSON     3,441,145
COIL FILTER
Original Filed Dec. 1, 1966
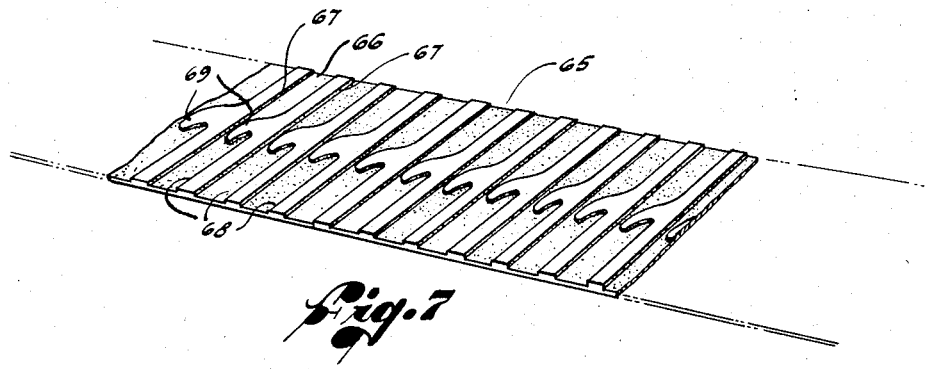
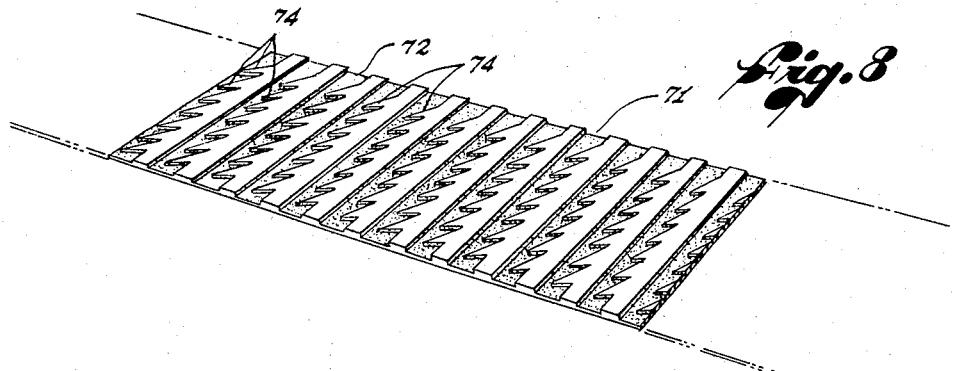
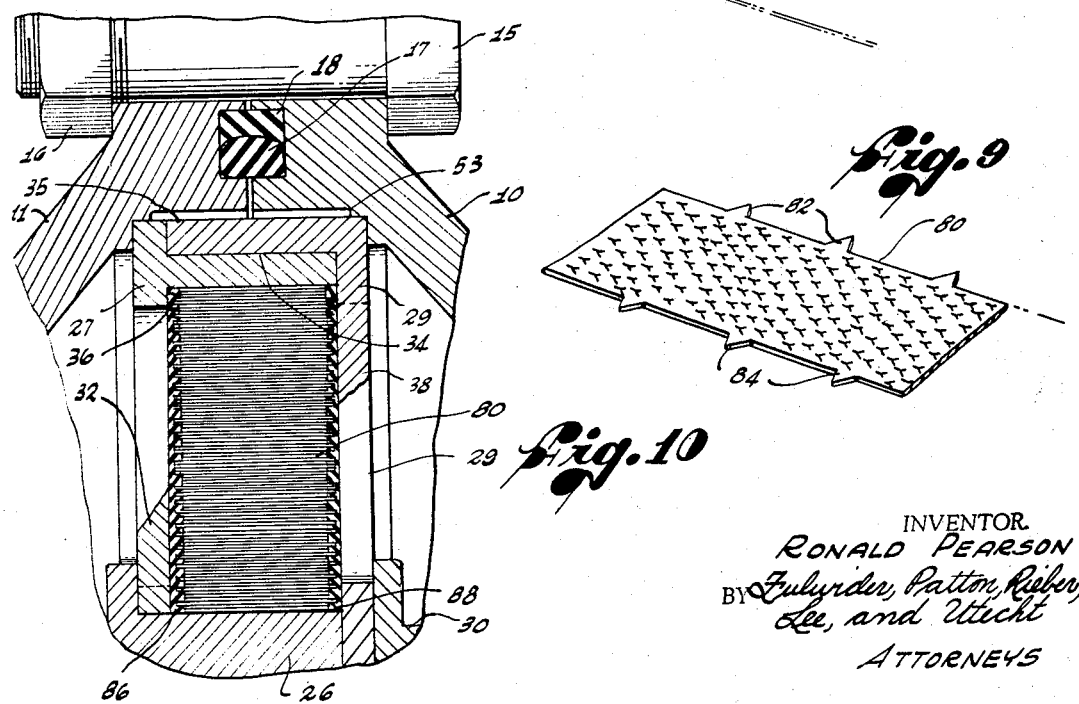
INVENTOR.
RONALD PEARSON
BY Fulwider, Patton, Rieber,
Lee, and Utecht
ATTORNEYS

3,441,145
COIL FILTER
Ronald K. Pearson, 15344 E. Pintura Drive,
Hacienda Heights, Calif. 91745
Continuation of application Ser. No. 628,175, Dec. 1, 1966. This application Dec. 20, 1967, Ser. No. 692,245
Int. Cl. B01d 27/12, 25/16, 25/00
U.S. Cl. 210—445　　　　　　　　　　　　　　7 Claims

ABSTRACT OF THE DISCLOSURE

An in-line flow filter having a coiled metal strip clamped in a housing. The coiled strip is an edge filter and has protrusions thereon to space the turns of the coil and to trap particles in the fluid to be filtered.

---

This application is a continuation of application Ser. No. 628,175, filed Dec. 1, 1966 which is a continuation-in-part of my co-pending application, Filter, Ser. No. 495,021, filed Sept. 28, 1965, now abandoned.

The present invention relates generally to filtration of particulate matter from liquid and gaseous media and, more particularly, to filters of this class utilizing edge and depth filtration.

My co-pending application, Ser. No. 562,043, filed June 6, 1966, now abandoned, shows a unitary or integral filter element construction in which the element takes the form of a disc and in which a filter assembly comprises a stack of such discs. The construction disclosed in that application has a large number of advantages which are also achieved by the present invention, such as absolute initial cleanliness of the filter, re-usability of the filter elements, the elimination of any possibility of downstream migration of portions of the filter media, the ability to withstand very great differential pressures, and great efficiency in the filtration of particles in the range under 100 microns. However, the filter arrangement shown in my co-pending application requires the handling of a great number of separate filter elements and the unitary structure of each disc is preferably accomplished by a process of etching. With the present invention, I have achieved a unitary filter construction of the general type shown in my co-pending application, but in which the filter comprises a single coiled strip, rather than a stack of separate filter elements. Additionally, the present invention makes possible a relatively inexpensive method of manufacture of the filter element whereby wider commercial application of filters utilizing my unitary filter element structure is possible.

Another important object of the present invention is to provide a filter arrangement, to achieve both edge and depth types of filtration, in which a greater filter area can be provided in an assembly of a given size or, conversely, in which a smaller filter assembly is attainable for a given inlet port size or capacity of filter.

The foregoing and other objects and advantages of my invention will be apparent from the following description of a presently preferred embodiment thereof, when taken in conjunction with the annexed drawings.

FIGURE 1 is an axial sectional view of a filter assembly incorporating the improved filter media;

FIGURE 2 is a sectional view taken along the line 2—2 of FIGURE 1, portions being broken away to reveal details of interior construction of the filter assembly;

FIGURE 3 is a fragmentary sectional view of the area 3 of FIGURE 2, on an enlarged scale, particularly showing the means of anchoring the inner end of the filter media strip;

FIGURE 4 is a fragmentary sectional view of the area 4 of FIGURE 2, particularly showing the means of locking the outer end of the filter media strip;

FIGURE 5 is a plan view of a fragment of one type of face for a filter media strip for use in the invention;

FIGURE 6 is a sectional view taken on the line 6—6 of FIGURE 5.

FIGURE 7 is a perspective view of a fragment of filter strip with a different etched pattern for trapping particles in a filter of my invention;

FIGURE 8 is a perspective view of a fragment of a filter strip with still another etched pattern for use in a filter of my invention;

FIGURE 9 is a perspective view of a fragment of filter strip which has an etched pattern like that shown in FIGURE 6, but wherein the strip is formed with pointed projections spaced along its edges; and FIGURE 10 is a fragmentary sectional view of a portion of the filter of FIGURE 1 using the strip of FIGURE 9, and showing plastic strips in which the points of the projections are embedded when the coil is changed in place, thereby to keep the turns from bulging under high pressure.

In general, the invention comprises an elongated strip of a thin and flexible sheet material that is coiled onto a reel while under sufficient tension to eliminate slack. The reel provides backing for the coil of filter media to resist the differential and operating pressures of the filter assembly. Additionally, the coil configuration is inherently adapted to rigidly oppose such pressures. The strip itself comprises a preferably imperforate base portion provided with spaced protrusions that are preferably integral with the base portion. These protrusions serve as spacers to effect a spacing between edges of adjacent coils of the filter strip, which edge spacing provides the surface or edge filtration gaps for the filter. The protrusions also provide a depth filter, the protrusions being arranged in such manner that any elongated particles which might penetrate between the edge gap, as for example, cotton linters, cannot follow tortuous paths defined by the protrusions and therefore become entrapped. Additionally, it is to be noted that the spiral or volute configuration of the influent edge of the filter media strip reduces the possibility of elongated particles penetrating the surface defined by the influent edge.

More particularly, the filter assembly may be of the in-line type illustrated, which includes a housing comprising a pair of hollow members 10 and 11 which may be generally cone-shaped in configuration. Preferably, the members 10 and 11 are adapted for releasable interconnection and to this end are formed with base flanges 12 and 13, respectively, that are formed with a plurality of alignable openings 14 adapted to receive a suitable fastening means, as for example, a bolt 15 and nut 16. Radially inwardly of the holes 14, the flanges 12 and 13 are formed with like annular grooves in registration with one another to define a suitable cavity for the reception of a seal ring 17 inside a backing ring 18 of Teflon or the like. The small diameter ends of the housing members 10 and 11 are provided with suitable bosses 19 and 20, respectively, which are tapped to receive threaded ends of an influent pipe and effluent pipe 22, respectively.

A reel assembly 25 is disposed within the filter housing, coaxially with the inlet and outlet pipes 21 and 22. This assembly comprises a preferably cylindrical spindle or spool 26 coaxially mounted in a generally cup-shaped male member 27, an elongated strip 28 of filter media coiled on the spindle 26 and contained within the member 27, a female member 29 that is also generally cup-shaped and receives the member 27, and a lock nut 30.

The filter strip may be made of a wide variety of metals, the choice ordinarily being dictated by the desired rating of the filter and the use to which the filter is to be put. Preferably, the strip is made of a metal capable of being made sufficiently thin or flexible and of sufficient strength to withstand the tension to be imposed thereon in coiling the strip onto its supporting structure. In the illustrated example of the invention, it is to be assumed that the strip 28 is made of a stainless steel material having an overall thickness on the order of .002 inch and an overall width on the order of ½ inch, and, further, that it is desired to have the filter with an absolute rating of 25 microns.

The reel configuration of the filter assembly shown is of particular utility for an application requiring the filter to be made of a metal strip, which may be manufactured as follows. The raw material comprises a coil of steel of the desired width which is unreeled and first passed through a pre-cleaning tank, thereafter to be guided to thickness rolling rolls. The strip is then fed into a coining roller to be embossed with protrusions of the desired plan configuration on one side of the strip. In this connection, as the strip is narrow and thin, it becomes feasible to employ coining for embossing the desired configuration, pattern and distribution of protrusions on the one side of the strip as a very great pressure of the rolls can be brought to bear on a relatively small area of the strip. After being thus formed, the strip is then passed to suitable straightening rollers, may then be passed through wire brush dirt removers and into an acid burr removal tank. Thereafter, the strip may be passed into a neutralizer tank to neutralize the acid and then through a cleaning tank, as for example a bath of triclorethylene, then subjected to a drying blast of hot air and finally, loosely wound onto a stock reel.

A filter strip may, of course, be made by other processes. For example, the protrusions on the strip may be formed by the etching process described in any previously mentioned co-pending application.

In FIGURE 5, the sheet metal strip 28 is illustrated as formed with a plurality of protrusions 28a formed on one side by coining so as to be integral with an imperforate base portion 28b. The protrusions 28a are Y-shaped in plan configuration and are oriented to have a pair of arms opening towards an influent edge of the strip 28, the stem portion pointing in the direction of the effluent edge of the strip. This configuration and pattern of protrusions is also disclosed in my afore-mentioned co-pending application. However, it will, of course, be understood that other configurations of protrusions may be employed including, for example, those other configurations also disclosed in my co-pending patent application.

The male member 27 has a hub 31 from which a plurality of arms 32 extend radially outwardly to a rim section 33. On one side of the rim section 33 there is an integrally formed circular wall or cylindrical flange 34 that is offset radially inwardly from the periphery of the male member 27, to define an annular shoulder 35. The cylindrical wall 34 is also offset radially outwardly relative to the inner diametral edge of the rim section 33 to define another annular shoulder 36 within the male member 27.

The female member 29 also has a hub section 37 from which a plurality of arms 38 extend radially outwardly to a rim section 39. A cylindrical wall 40 is formed integrally with the periphery of the rim section 39 and has about the same outer diameter as the outer diameter of the rim section 33 of the male member 27. The cylindrical wall 40 has a radial thickness of about the width of the annular shoulder 35 of the male member 27 and matingly coaxially receives the cylindrical wall 34 of the male member. As is shown in FIGURE 1, the cylindrical walls 34 and 40 have substantially the same axial length and the rim section 39 of the female member has its inner diametral edge at the same radial distance from the center of the assembly as the inner ege of the rim section 33 of the male member 27. Thus, when the male and female members are coupled, an annular internal groove is defined within the male member wall 34 between those portions of the rim sections of the male and female members extending radially inwardly beyond the wall 34.

The hub 31 of the male member 27 rotatably receives the spool 26, the spool being formed adjacent one end with a circumferential flange 42 that seats against the outer face of the hub section 31. When the spool 26 is thus seated in the hub section 31 of the male member, its body portion is exposed within the male member for an axial distance which is, preferably, no greater than the width of the strip 28 and which also corresponds to the axial dimension of the wall 34.

In winding the strip 28 onto the spool 26 the male member 27 is preferably held immobile, while apart from the female member 29. The spool 26 is adapted to anchor the inner end of the strip 28 and is rotated within the hub section 31 of the immobile male member while the tape is fed into the male member through a slot 43 formed in the wall 34. As the spool 26 is rotated, tension is maintained in the strip 28 whereby successive coils of the strip are wound onto the spool without any slackness. When the male member 27 has been filled with the coiled strip 28, rotation of the spool 26 is stopped and the female member 29 is then mounted over the male member 27, the wall 40 of the female member being provided with a slot 44 to receive or pass the protruding end of the strip 28. The two members 27 and 29 are then rotated oppositely relative to one another whereby a portion of the strip 28 is jammed between the walls 34 and 40. The end of the strip 28 protruding outwardly beyond the wall 40 of the female member 29 is then cut.

More specifically, to anchor the inner end of the strip 28, a blind bore 45 is formed in the body portion of the spool 26 so as to open into the surface of an annular shoulder defined between the body portion of the spool and a reduced diameter threaded portion 46 that will extend through the hub 37 of the female member 29. A slot 47 extends tangentially from the blind bore 42 to extend outwardly of the spool 26 to open into the surface of the spool. The inner end of the strip 28 is inserted through the slot 47 and forced to curl within the blind bore 45 to be held in place by an expansion pin 48 that is inserted into the bight of the inner end of the strip 28. It will, of course, be understood that the expansion pin is contracted before insertion and after insertion is allowed to expand whereby the inner end bight of the strip 28 is clamped against the surface of the blind bore 45.

When the end of the strip 28 is secured to the spool 26, care should be taken to dispose that side of the strip 28 bearing the protrusions 28a facing outwardly of the spool. While this is not considered to be essential, it does have the advantage of disposing the smooth side of the strip so as to face radially inwardly to lie on the smooth surface of the spool 26 whereby successive coils of the strip 28 will more regularly and uniformly lie upon one another.

The wall 34 of the male member 27 is formed with the slot 43 at an angle, relative to tangents to the inner and outer surfaces of the wall 34, such as to minimize bending of the strip 28 as it is fed through the slot. The slot 43 is preferably large enough to freely pass the strip without abrading it. Upon rotation of the spool 26 while the male member 27 is held rotationally immobile, the strip is subjected to tension by means of training it around a series of guide rollers for example, or feeding between padded rollers that are pressed upon one another. Additionally, the exit of the strip 28 from the slot 43 causes a bending of the strip which in some instances may be sufficient to insure enough tension in the strip so that the coils are snugly wound upon one another as the spool is rotated. When the strip has filled the male housing 27, the female housing is then placed around the male housing with the tail of the strip being guided through the slot 44 of the female wall 40. The slot 44 is preferably set an an angle in the wall 40 such that it will comprise an extension of the slot 43 in the male wall 34, as indicated by the phantom outline position of the strip 28 in FIGURE 4. This arrangement will facilitate reception of the extended strip into the slot 44. The female member 29 is then rotated in counterclockwise direction, as indicated in FIGURE 4, to wedge a portion of the strip 28 into the tolerance between the outer surface of the wall 34 and the inner surface of the wall 40. This results in a slight eccentricity locking the male and female members against relative angular movement and so prevents unravelling of the strip 28. The nut 30 is then run onto the threaded stud 46 of the spool 26 to clamp the hub portions 31 and 37, and the innermost turns of the strip 28 on the spool, between the flange 42 of the spool and the nut.

The housings 10 and 11 are adapted to act as a clamp and seal on the rim sections 33 and 39 of the filter assembly. To this end, the housings 10 and 11 are formed with annular shoulders 51 and 52, respectively, adapted to seat the rim sections 39 and 33, respectively. The axial length of the filter assembly 25 is such that when it is seated in the grooves 51 and 52 there is a slight clearance between the confronting faces of the housing flanges 12 and 13. Accordingly, upon tightening of the nuts 16 on the bolts 15, a clamping and sealing action is exerted on the telescoped walls of the male and female members and their rim sections. It will be noted that the housings 10 and 11 are counterbored to provide an annular clearance space 53 around the wall 40 of the female member 29, for the reception of any protruding tail of the strip 28.

Where high differential pressures are to be anticipated, a generally bell-shaped support member 55 may be mounted in the housing 11, on the effluent side of the filter assembly, to act as a brace against the spool 26. For this purpose, the housing 11 is formed with an internal annular shoulder 56 adapted to seat the large end of the support member 55 and the smaller end of the support member is seated on a shoulder 57, formed on the confronting end of the spool 26. In order to pass the effluent of the filter, this support member 55 is formed with a plurality of spaced apart passageways 58.

The coiled strip 28 within the male and female housing provides both surface or edge and depth filtration. As will now be apparent, the result of coiling the strip onto the spool 26 gives a volute inlet edge of the strip in which the successive imperforate base portions 28b are held in spaced relationship by the protrusions 28a. Obviously, the width of this gap determines the size of substantially spherical particles which will collect on the surface defined by the influent edge of the strip 28. Thus, if it be assumed that the base portion 28b of the strip has a thickness of .001 inch and that the projections or protrusions 28a have a height above the base of another .001 inch, then any substantially spherical particles exceeding substantially 25 microns in size will be collected on the influent side of the filter, i.e., on exposed area of the coil illustrated in FIGURE 2. Elongated particles less than 25 microns in thickness may penetrate between base portions 28b of the coiled strip but this is unlikely unless the elongated particle can assume an arcuate shape having as a center of radius the center of the filter assembly. Such elongated particles as do penetrate between the base portions 28b of the strip will become entrapped by the protrusions 28a, which define a very tortuous path, and the particular Y-shape of the protrusions 28a illustrated in FIGURE 5 is well adapted to hook any such elongated particulate matter even if it is less than 25 microns in cross section. Furthermore, as has been pointed out in my co-pending application, any spherical particles less than 25 microns in size will tend to become entrapped within the arms of the Y-shaped protrusions, which provide a form of cavity in which such tiny particles will be trapped.

It should also be noted that the filter configuration is self sealing to a great degree. That is, the innermost coil of the strip 28 is within the diameter of the hub portion 31 of the male member 27 and hub portion 37 of the female member 29. Then, when the nut 30 is tightened, not only are these two hub sections clamped together, but also the innermose coils of the strip 28 are also clamped. This provides a metal to metal seal or, in effect, an area within the diameter of the hub sections that is blind, or a gap smaller than the gap between coils of the strip 28. This is also true with respect to those turns or coils of the strip 28 that are disposed radially outwardly of the diameter defined by the innermost edges of the rim sections 33 and 39 of the male and female member, particularly, the outermost coil. There, as the peripheral portions of the male member 27 and female member 29 are clamped between the housings 10 and 11, the outermost turns of the strip are likewise clamped between the rim sections, so providing a metal to metal seal or small enough gap. A metal to metal seal or sufficiently small gap is also provided by the seating of the rim sections 33 and 39 within the annular seats 51 and 52 of the housings 10 and 11.

It should also now be apparent that the filter assembly is inherently adapted to withstand relatively high differential pressures, due to the rigid column effect achieved by the coiled strip 28. Thus, the relatively thin sheet material, when arranged in a tubular configuration, becomes rigid against axial forces and particularly so when the strip 28 has been wound onto the spool 26 with sufficient tension to prevent any slack from occurring. When the filter assembly is used in a housing with the support member 55, it is capable of withstanding extremely high pressure differentials on the order of 10,000 p.s.i.

The filter assembly has an extremely long service life due to the fact that it can very readily be cleaned when sufficient contaminant has built up on the influent side of the assembly to significantly decrease the flow rate. Thus, by removal of the nuts and bolts 16 and 15, the filter assembly 25 may be removed as a unit after which it may be degreased and then subjected to sonic cleaning, all of which may be accomplished without separating the male and female members or unwinding the strip 28. Alternatively, the filter assembly may remain in the housings 10 and 11 and the housing removed with the filter assembly still clamped inside. Then the unit can be back-flushed and immersed into a sonic tank for cleaning. As yet another alternative, the filter may be completely disassembled to unwind the strip 28 from the spool 26 after which all of the parts of the entire filter assembly may be individually cleaned and the parts then re-assembled.

FIGURES 7 and 8 illustrate filter strips having etch patterns uniquely shaped to cause fluid passing through a filter to be subjected to a swirl, and causing particles to be carried into and lodged in crevices. Referring to FIGURE 7, a thin strip 65 is etched to provide channels 66 through which fluid passes. Each etched channel 66 has an unbroken wall 67 and a wall 68 that has a folded-back or reentrant portion 69 extending into the channel and toward the upstream side of the filter. With a coiled filter element of this construction, fluid forced between the turns is subjected to a swirl in the crevices, tending to draw particles into the crevices formed between the walls 67 and the extensions 69.

FIGURE 8 illustrates a strip 71 with an etch pattern which serves the same purpose as for the strip of FIGURE 7. The channels 72 in FIGURE 8 are shaped so that one wall 73 thereof is provided with a number of spaced reentrant portions 74.

FIGURES 9 and 10 illustrate a filter of my invention wherein the coiled strip and the parts between which it is clamped are cooperatively arranged to prevent undesired spreading apart of adjacent turns due to extremely high differential pressures. Particularly when the filter is dismantled for cleaning, upon reassembly, the strip may not be re-coiled as well as originally. Even in the original assembly, the completed coil may have slack, e.g., as in the manner of a roll of film, with which, after setting for a while, it is found that, although presumably tightly coiled, it can be tightened still further. When a filter strip is thus coiled, with any slack, high differential pressures can force adjacent turns to spread apart, and thereby permit undesirably large particles to pass through the filter structure.

To avoid this problem, I provide means for locking the edges of the coil strip against relative movement. In brief, and referring to FIGURES 1 and 2, I secure plastic strips, e.g., of nylon, neoprene and the like, to the inner surfaces of the radial arms 32, 38 of the male and female members 27, 29, so that when they are clamped in place, the edges of the coil strip "bite" into the strips, and are thus securely fixed against radial displacement.

Further in this connection, and referring to FIGURES 9 and 10, the strip 80 may be formed with spaced, pointed projections 82, 84 extending from its opposite edges. For ease of manufacture, the points 82, 84 are equally spaced, and such that on the innermost turn, respective, points on the edges confront the radial arms 32, 38. Also, it is preferred that the spacing of the points is such the innermost turn has one or more points located intermediate adjacent radial arms, and such that each turn has points located intermediate the edges of each radial arm.

Secured to the inner surfaces of the radial arms 32 of the male member 27 are strips 86, and identical strips 88 are secured to the inner surfaces of the radial arms 38 of the female member 29. The strips 86, 88 are made of material which can be penetrated by the sharp ends of the points, e.g., nylon, neoprene, aluminum.

Upon forming the coil and locating it between the members 27, 29 and clamping them together, the clamping force causes the points to enter the strips 86, 88. Thereafter, when the filter is subjected to high differential pressures, the turns of the coil are firmly held against radial separation. When the filter is dismantled for cleaning the strips 86, 88 may be left on the radial arm. If desired, however, the strips may be removed and new strips secured to the arms.

From the foregoing, it is apparent that various modifications may be made in the structures illustrated and described without departing from the spirit and scope of my invention. Accordingly, I do not intend that my invention be limited, except as by the appended claims.

I claim:
1. Filter apparatus comprising:
   a hub member;
   a ribbon of flexible sheet metal material having no openings therein, said ribbon being wound in a coil mounted on said hub member, said sheet metal material being etched on one surface to provide rows of protrusions extending the width of the ribbon, the height of the protrusions determining the spacing between adjacent turns of said coils, said protrusions being of such size and configuration as to present a tortuous path for and to trap particles in a fluid to be filtered which are small enough to enter the space between the edges of adjacent turns of said coil, said one surface and lateral surfaces of the protrusions thereon being etch-roughened to provide surface irregularities for trapping particles which might otherwise pass through said coil between its adjacent turns;
   holding means for holding the inner and outer ends of said coil in fixed spaced relation, said holding means including a pair of circular elements having spaced radial arms located on opposite ends of said hub member;
   a strip of deformable material between the inner surface of each radial arm and said coil;
   and means for clamping said circular elements together to force the edges of the turns of said coil into said strips.
2. A filter as defined in claim 1, wherein said coil is formed with spaced points along its edges, those points located between the edges of the strips being embedded in said strips.
3. A filter as defined in claim 1, wherein said protrusions are formed with crevices facing the side of the coil through which fluid enters between the edges of adjacent turns.
4. Filter apparatus comprising:
   a ribbon of flexible sheet metal material having no openings therein, said ribbon being wound in a coil, said sheet metal material being etched on one surface to provide rows of protrusions extending the width of the ribbon, the height of the protrusions determining the spacing between adjacent turns of said coil, said protrusions being of such size and configuration as to present a tortuous path for and to trap particles in a fluid to be filtered which are small enough to enter the space between the edges of adjacent turns of said coil, said one surface and lateral surfaces of the protrusions thereon being etch-roughened to provide surface irregularities for trapping particles which might otherwise pass through said coil between its adjacent turns;
   holding means for holding the inner and outer ends of said coil in fixed spaced relation, said holding means including a pair of concentric rings surrounding said coil, said rings having nonradial openings through which the outer end of said coil extends, said openings being offset to cause a portion of the end of the coil to be clamped between the confronting faces of said rings:
   a hub on which said coil is mounted, the inner end of said coil being secured to said hub;
   plates having spaced radial arms, on the opposite sides of said coil, one of said rings being integral with and forming a flange for one plate, and the other ring being integral with and forming a flange for the other plate;
   and respective strips of deformable material located between the confronting portions of said radial arms and said coil, said plates being clamped together to cause the edges of said coil to enter and be held in place by said strips.
5. A filter as defined in claim 4, wherein said ribbon is formed with spaced pointed portions along its edges which are embedded in said strips upon said plates being clamped.
6. A filter as defined in claim 4, and further including a housing having inlet and outlet ports; and means supporting said coil and holding means in said housing with the axis of said coil parallel to the axes of said ports.
7. A filter comprising:
   an elongated strip of a flexible sheet material having a plurality of spaced apart protrusions of a substantially uniform height on a side thereof;
   a spool onto which said strip is snugly wound to dispose said strip in a coil whereby successive coils of said strip have edges spaced apart a distance, measured radially of said coil, corresponding to the height of said protrusions on said strip to define a spiral gap, on an influent side of said strip, to exclude particles larger than said gap;
   a generally cup-shaped male member to contain said coil, said male member including a hub that seats said spool, said male member also including a cylindrical wall closely surrounding said coil, said hub and said wall being interconnected by a plurality of rigid generally radially disposed arms against an effluent side of said coil to brace said strip against influent pressure and to pass therebetween the effluent of said filter;

a generally cup-shaped female member having a hub portion and also having a cylindrical wall telescopically containing said wall of said male member, said wall of said female member and said hub portion of said female member being interconnected by a plurality of generally radially disposed arms, said wall of said male member and said wall of said female member both being formed with a slot extending therethrough adapted to receive a protruding end portion of said strip, said male member and female member walls having a clearance therebetween adapted for wedging together of said male and female members upon relative angular movement therebetween as a portion of said protruding portion of said strip is wedged between said walls whereby unwinding movement of said strip is prevented;

and a fastening means including said spool for holding said male and female members together in assembled relationship with said coil.

References Cited

UNITED STATES PATENTS

| | | | |
|---|---|---|---|
| 355,332 | 1/1887 | Meckel | 24—136 |
| 865,691 | 9/1907 | Fox | 210—445 |
| 1,639,133 | 8/1927 | Greene | 210—498 X |
| 1,820,533 | 8/1931 | Foley | 210—494 |
| 1,824,079 | 9/1931 | Foley | 210—494 |
| 1,971,723 | 8/1934 | O'Dell | 29—526 |
| 2,057,497 | 10/1936 | McNeal | 210—392 |
| 2,134,350 | 10/1938 | Wooley | 174—65 X |
| 2,256,145 | 9/1941 | Hock | 210—445 |

FOREIGN PATENTS

| | | |
|---|---|---|
| 193,308 | 12/1907 | Germany. |
| 733,820 | 4/1943 | Germany. |
| 846,245 | 8/1952 | Germany. |
| 297,354 | 12/1928 | Great Britain. |
| 352,038 | 7/1931 | Great Britain. |
| 699,168 | 10/1953 | Great Britain. |
| 521,352 | 8/1957 | Italy. |

REUBEN FRIEDMAN, *Primary Examiner.*

C. M. DITLOW, *Assistant Examiner.*

U.S. Cl. X.R.

55—278, 503, 520; 210—446, 451, 494